United States Patent
Harting et al.

(10) Patent No.: US 9,703,333 B1
(45) Date of Patent: Jul. 11, 2017

(54) INSERTION/EJECTION ASSIST MECHANISM FOR REMOVABLE STORAGE CARTRIDGE SYSTEM

(71) Applicant: HGST Netherlands B.V., Amsterdam (NL)

(72) Inventors: John L. Harting, San Jose, CA (US); Thomas F. Meehan, Los Altos, CA (US); Herman Chong-Han Yang, Milpitas, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/077,695

(22) Filed: Mar. 22, 2016

(51) Int. Cl.
    *G06F 1/16*     (2006.01)
    *G11B 15/675*     (2006.01)
    *G11B 33/02*     (2006.01)
    *G06F 1/18*     (2006.01)

(52) U.S. Cl.
    CPC ............. *G06F 1/187* (2013.01); *G11B 15/675* (2013.01); *G11B 33/022* (2013.01)

(58) Field of Classification Search
    CPC ....................................... G06F 1/187
    See application file for complete search history.

(56) References Cited

U.S. PATENT DOCUMENTS

| | | | |
|---|---|---|---|
| 4,071,859 A | 1/1978 | Sami | |
| 4,530,252 A * | 7/1985 | Sarges | F16H 35/14 360/96.51 |
| 5,010,426 A * | 4/1991 | Krenz | G11B 25/043 360/137 |
| 5,179,871 A * | 1/1993 | Orimoto | G06K 13/08 360/96.3 |
| 5,325,263 A | 6/1994 | Singer et al. | |
| 5,454,080 A | 9/1995 | Fasig et al. | |
| 5,518,412 A * | 5/1996 | Larabell | H01R 13/62938 439/153 |
| 5,573,413 A * | 11/1996 | David | G06K 13/08 439/157 |
| 5,721,669 A | 2/1998 | Becker et al. | |
| 5,737,185 A * | 4/1998 | Morrison | G06F 1/184 360/99.07 |
| 5,975,735 A | 11/1999 | Schmitt | |
| 6,043,954 A | 3/2000 | Muse et al. | |
| 6,045,377 A * | 4/2000 | Kajiura | G06K 7/0047 439/159 |
| 6,059,588 A * | 5/2000 | Tung | G06K 13/08 439/159 |
| 6,619,971 B1 * | 9/2003 | Chen | G06K 7/0047 439/159 |
| 6,793,348 B2 * | 9/2004 | Lee | F16M 11/041 248/188.2 |
| 6,948,956 B2 * | 9/2005 | Ngo | G06K 13/0825 439/155 |

(Continued)

*Primary Examiner* — Adrian S Wilson
(74) *Attorney, Agent, or Firm* — John D. Henkhaus

(57) ABSTRACT

A removable storage cartridge system includes a rack and pinion gear reduction mechanism that assists in extending an eject spring and may assist in engaging a pair of data interface connectors as a cartridge is inserted into the system, and that may further function as a gear multiplication mechanism that assists in disengaging the pair of data interface connectors as the cartridge is ejected from the system.

20 Claims, 6 Drawing Sheets

(56) References Cited

U.S. PATENT DOCUMENTS

| | | | | |
|---|---|---|---|---|
| 6,978,903 B2* | 12/2005 | Son | ............... | G06F 1/184 |
| | | | | 211/26 |
| 7,077,671 B2* | 7/2006 | Su | ............... | H01R 13/635 |
| | | | | 439/159 |
| 7,154,756 B2* | 12/2006 | Ito | ............... | G06F 1/184 |
| | | | | 312/223.2 |
| 7,379,294 B2 | 5/2008 | Chen | | |
| 8,582,401 B2 | 11/2013 | Kawasaki et al. | | |
| 8,944,833 B2* | 2/2015 | Takahashi | ............... | H05K 5/0295 |
| | | | | 439/159 |
| 2002/0104396 A1* | 8/2002 | Megason | ............... | F16H 51/00 |
| | | | | 74/109 |
| 2002/0192991 A1* | 12/2002 | Motojima | ............... | H01R 13/62905 |
| | | | | 439/157 |
| 2003/0235032 A1* | 12/2003 | Lee | ............... | G06F 1/187 |
| | | | | 361/679.57 |
| 2006/0133030 A1* | 6/2006 | Takahashi | ............... | G06F 1/184 |
| | | | | 361/679.36 |
| 2007/0206351 A1* | 9/2007 | Szelong | ............... | G06F 1/187 |
| | | | | 361/726 |
| 2012/0127658 A1* | 5/2012 | Hartman | ............... | G06F 1/186 |
| | | | | 361/679.59 |
| 2012/0162877 A1* | 6/2012 | Nakanishi | ............... | G03B 29/00 |
| | | | | 361/679.01 |
| 2013/0070415 A1* | 3/2013 | Terry | ............... | G11B 33/124 |
| | | | | 361/679.38 |
| 2013/0117488 A1 | 5/2013 | Perry et al. | | |
| 2014/0152164 A1* | 6/2014 | Tu | ............... | G06F 1/187 |
| | | | | 312/333 |

* cited by examiner

INSERT A REMOVABLE STORAGE DEVICE CARTRIDGE, COMPRISING A REMOVABLE STORAGE DEVICE HOUSED IN A CARRIAGE, INTO AN ENCLOSURE BAY MOUNTING BRACKET;

WHEREIN INSERTING INCLUDES ENGAGING A RACK GEAR WITH A PINION GEAR TO FORM A GEAR REDUCTION MECHANISM THAT OPERATES TO ASSIST IN (A) EXTENDING AN EJECT SPRING AND (B) ENGAGING A REMOVABLE STORAGE DEVICE DATA INTERFACE CONNECTOR WITH A SYSTEM CIRCUIT BOARD DATA INTERFACE CONNECTOR.
802

EJECT THE REMOVABLE STORAGE DEVICE CARTRIDGE FROM WITHIN THE ENCLOSURE BAY MOUNTING BRACKET;

WHEREIN EJECTING INCLUDES OPERATING THE RACK GEAR WITH THE PINION GEAR TO FORM A GEAR MULTIPLICATION MECHANISM THAT OPERATES TO ASSIST IN DISENGAGING THE REMOVABLE STORAGE DEVICE DATA INTERFACE CONNECTOR FROM THE SYSTEM CIRCUIT BOARD DATA INTERFACE CONNECTOR

INSERTION/EJECTION ASSIST MECHANISM FOR REMOVABLE STORAGE CARTRIDGE SYSTEM

FIELD OF EMBODIMENTS

Embodiments of the invention may relate generally to removable storage cartridge systems and more particularly to an insertion assist mechanism for a removable storage cartridge system.

BACKGROUND

With the continued rise in the use of all kinds of digital media comes a corresponding demand for digital data storage solutions. Home consumers and professionals alike demand portability, flexibility, expandability, and ease of use, for example, in digital data storage systems. Hence, data storage system designers and engineers work to meet such demands.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are generally directed at a removable storage cartridge system, a removable storage system enclosure, a removable storage device carriage configure to removably couple with a removable storage device, and a method of configuring a removable storage cartridge system.

Embodiments include such a carriage comprising a rack gear, and such an enclosure comprising a mounting bracket comprising a pinion gear. The rack gear is configured to interact with the pinion gear to form a gear reduction mechanism that, in direct response to a first pushing force applied directly or indirectly to the carriage, assists in extending an eject spring and engaging a pair of data interface connectors. Further, the rack gear is configured to interact with the pinion gear to form a gear multiplication mechanism that, in direct response to a second pushing force applied directly or indirectly to the carriage, assists in disengaging the pair of data interface connectors.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 8 is a flow diagram illustrating a method of configuring a removable storage cartridge system, according to an embodiment.

DETAILED DESCRIPTION

Approaches to a removable storage cartridge system are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a removable storage system, such as a system having multiple hard disk drive (HDD) storage devices and/or solid-state drive (SSD) storage devices (which may also be referred to as "semiconductor memory devices"). Thus, in accordance with an embodiment, a perspective view illustrating a removable storage system is shown in FIG. 1 to illustrate an exemplary operating context.

Figure 1:
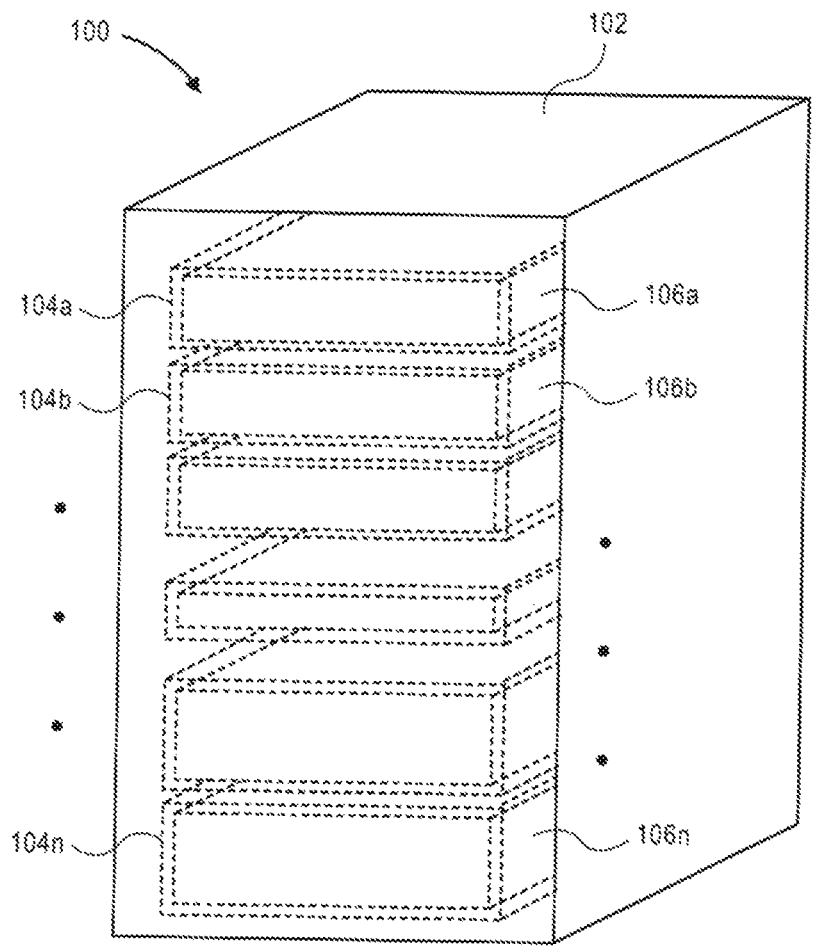
FIG. 1 is a front perspective view illustrating a removable storage system, according to an embodiment.

FIG. 1 is a front perspective view illustrating a removable storage system, according to an embodiment. Removable storage system 100 comprises an enclosure 102 having at least one bay 104*a-n* configured to house a respective removable storage device 106*a-n*, where n represents a variable number that may vary from implementation to implementation. As described in more detail elsewhere herein, each bay 104*a-n* may have a corresponding enclosure mounting bracket movably coupled therewith and/or therein, and each removable storage device 106*a-n* may be adapted into a removable storage cartridge by being removably coupled with a removable storage device carriage, according to embodiments. Thus, a removable storage cartridge system, such as removable storage system 100, may be configured or provisioned to house a plurality of removable storage cartridges within a respective mounting bracket.

The number of removable storage cartridges or removable storage devices (e.g., n) that enclosure 102 is configured to house may vary from implementation to implementation. Furthermore, a given removable storage system 100 may be adaptable and reconfigurable into different configurations housing a different number and/or different sizes of removable storage devices based, for example, on corresponding compatible enclosure mounting brackets and removable storage device carriages.

Removable Storage Cartridge System

Figure 2:
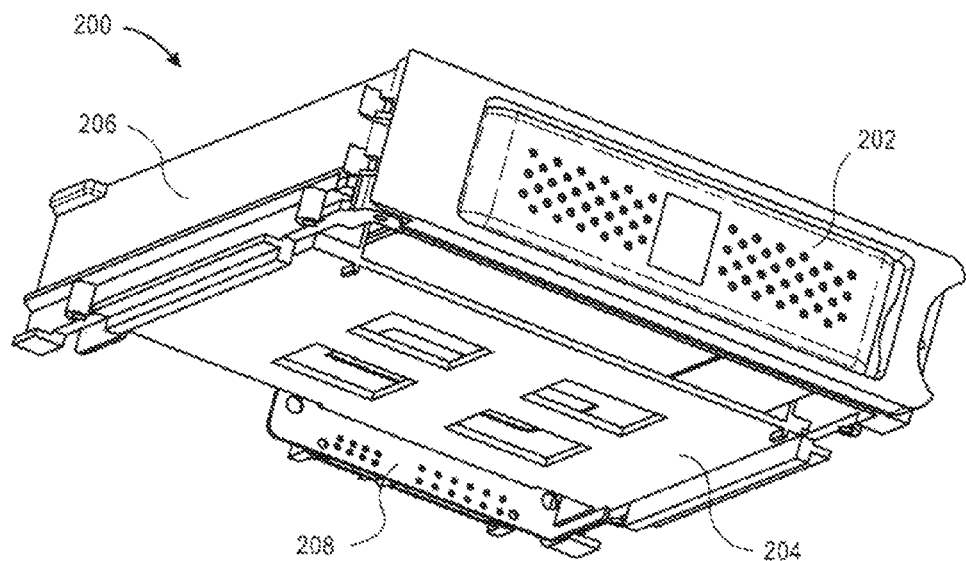
FIG. 2 is bottom perspective view illustrating components of a removable storage cartridge system, according to an embodiment.

FIG. 2 is bottom perspective view illustrating components of a removable storage cartridge system, according to an embodiment. Components of a removable storage cartridge system 200 comprise a removable storage device 202 (e.g., a hard disk drive [HDD] or a solid-state drive [SSD], also known as a semiconductor memory device) removably coupled with a removable storage device carriage 204 (or "carriage 204"), and an enclosure mounting bracket 206 (or "mounting bracket 206") that may be movably coupled with an enclosure, such as enclosure 102 (FIG. 1), and positioned within an enclosure bay, such as a bay 104a-n. According to an embodiment, a removable storage device 202 can be removably inserted into and thus housed within a respective carriage 204, forming a "removable storage device cartridge" (or "cartridge"). Continuing, a cartridge can then be removably inserted into, removably coupled with, housed within a respective mounting bracket 206. Components further comprise a printed circuit board 208 (or "PCB 208"). The PCB 208 is configured to mate with a corresponding circuit board constituent to the removable storage device 202. In a multiple-bay system, each respective PCB 208 may communicate with a removable storage cartridge system "master" circuit board which, in turn, may communicate with an external system such as a computer.

Configured as described in the foregoing description, a loaded cartridge can be inserted into a removable storage cartridge system (e.g., system 100 of FIG. 1) and removably locked into place using a push-push mechanism, for example. A circuit board constituent to the removable storage device 202 would mate with the PCB 208 as part of this cartridge insertion process, by way of respective electrical connectors, according to an embodiment. The removable storage device 202 is held firmly in place while a user can electrically access the removable storage device 202 for reading and writing data. In a scenario in which a push-push mechanism is employed, when the user wants to remove the removable storage device 202 (e.g., as a cartridge) from the removable storage cartridge system, one would push the removable storage device 202 further into the removable storage cartridge system, which would unlock the cartridge and allow it to be removed from the enclosure (e.g., 102 of FIG. 1).

Removable Storage Cartridge

Figure 3:
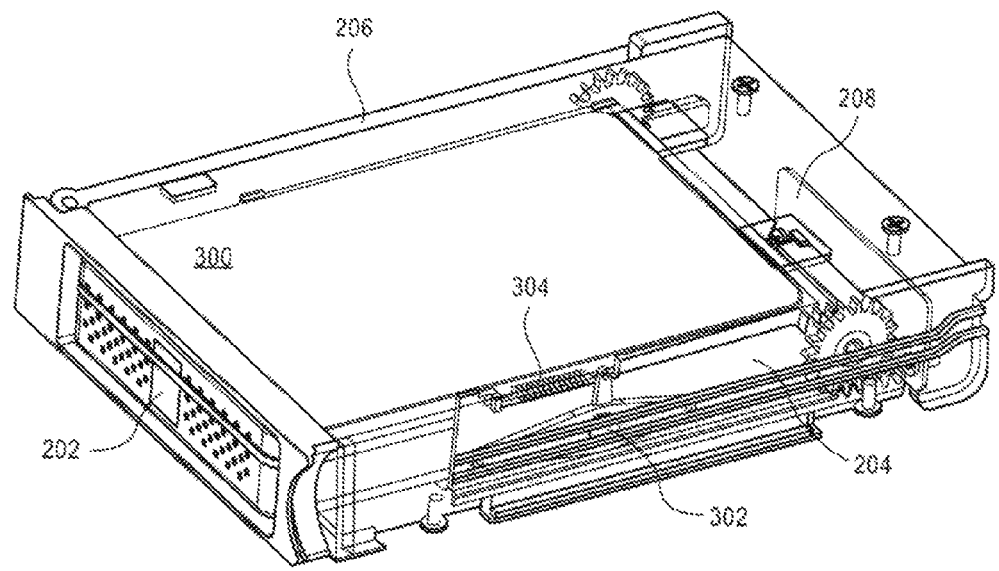
FIG. 3 is top front perspective view illustrating a removable storage cartridge inserted in a mounting bracket, according to an embodiment.

FIG. 3 is top perspective view illustrating a removable storage cartridge inserted in a mounting bracket, according to an embodiment. Similarly as described in reference to FIG. 2, a removable storage device cartridge 300 (or "cartridge 300") comprises a removable storage device 202 removably inserted into and thus housed within and coupled with a carriage 204. Further, the cartridge 300 is depicted as inserted in the mounting bracket 206. In FIG. 3, the wall of the carriage 204 is depicted transparently so that other components on the inside of that wall can be viewed.

According to an embodiment, a removable storage cartridge system (e.g., system 100 of FIG. 1) comprises a rotatable lock bar 302 and a lock bar spring 304. According to an embodiment, the lock bar 302 and lock bar spring 304 are constituent to the carriage 204, where such a carriage can be inserted into and ejected from system 100 as a unit along with the lock bar 302 and lock bar spring 304 (i.e., as an assembly), preferably as part of a cartridge 300. The lock bar 302 and the lock bar spring 304 are part of a linear push-push mechanism, which is described in more detail herein.

Lock Guide

Figure 4:
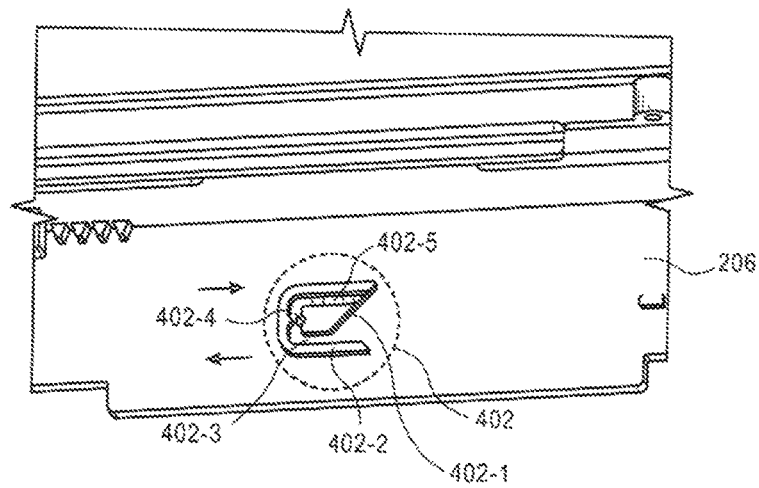
FIG. 4 is a side view illustrating a push-push lock guide, according to an embodiment.

FIG. 4 is a side view illustrating a push-push lock guide, according to an embodiment. According to an embodiment, removable storage cartridge system (e.g., system 100 of FIG. 1) comprises a lock guide 402. According to an embodiment, the lock guide 402 is constituent to the mounting bracket 206, in which a carriage 204 (FIGS. 2-3) can be inserted into and ejected from system 100 as a unit with the lock bar 302 (FIG. 3) and lock bar spring 304 (FIG. 3) (i.e., as an assembly), preferably as part of a cartridge 300. The lock guide 402 is part of a linear push-push mechanism, which is described in more detail herein.

According to an embodiment, lock guide 402 comprises an inclined wall 402-1 structure that, in conjunction with a guide wall 402-2, forms an insertion channel 402-3. The insertion channel 402-3 leads to a lock detent 402-4, which corresponds to a locked position, such as when a lock bar protuberance 302-1 (FIG. 5) is disposed therein or therewith. A detent may be described as a device (e.g., a catch) for positioning and holding one mechanical part in relation to another mechanical part in a manner such that it can be released by force applied to one of the parts. Lock guide 402 further comprises an ejection channel 402-5 positioned opposing the insertion channel 402-3 with the lock detent 402-4 in between. According to an embodiment, the insertion channel 402-3, the lock detent 402-4, and the ejection channel 402-5 together form an m-shape (e.g., as or similar to as depicted in FIG. 4).

Lock Bar

Figure 5:
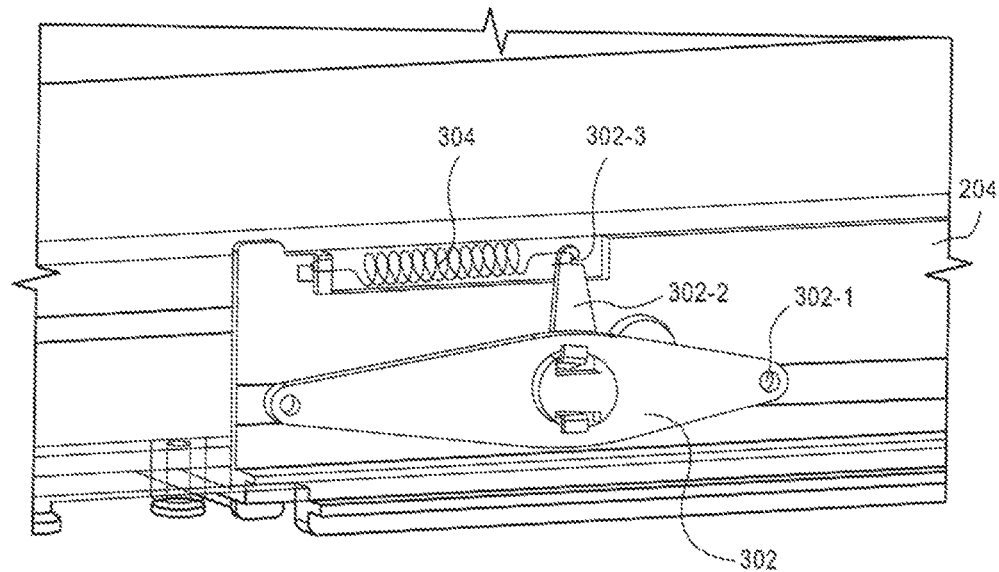
FIG. 5 is a side view illustrating a push-push lock mechanism, according to an embodiment.

FIG. 5 is a side view illustrating a push-push lock mechanism, according to an embodiment. The lock mechanism comprises the rotatable lock bar 302 and the lock bar spring 304. According to an embodiment, the lock bar 302 comprises a protuberance 302-1 (for non-limiting examples, a pin or nub) configured and positioned to slide within the insertion channel 402-3 (FIG. 4) and the ejection channel 402-5 (FIG. 4) and to removably couple with the lock detent 402-4 when in a position corresponding to the locked position associated with a cartridge 300. Alternate structural forms other than a protuberance 302-1 are contemplated for providing a guide for movement of the lock bar 302 within the insertion channel 402-3 and the ejection channel 402-5 and still remain within the scope and practice of embodiments. The lock bar 302 further comprises a spring attachment extension 302-2 having a spring attachment feature 302-3 (for non-limiting examples, a slot or hole), which lock bar spring 304 can attach to at one of its ends. The lock bar spring 304 is configured and positioned such that it is extendable in response to a first pushing force applied directly or indirectly to the carriage 204 in a particular direction, and is contractible in response to a second pushing force applied directly or indirectly to the carriage 204 in the particular direction. The first pushing force causes the reception of the carriage 204 into the mounting bracket 206 (FIGS. 2 and 4) and positions the carriage 204 into a locked position within the enclosure (e.g., enclosure 102 of FIG. 1), and the second pushing force releases the carriage 204 from the locked position.

The lock guide 402 (FIG. 4) and the lock bar 302 (FIGS. 3 and 5) operate together to form a linear push-push mechanism for inserting (e.g., in the direction of the bottom arrow shown in FIG. 4) and ejecting (e.g., in the direction of the top arrow shown in FIG. 4) a removable storage device 202 (FIGS. 2, 3) into and from, respectively, a removable storage cartridge system such as system 100 (FIG. 1).

Referring back to FIG. 5, according to an embodiment, the lock bar spring 304 is positioned at a distance and in a direction away from the protuberance 302-1, which thereby provides a rotational bias to the lock bar 302 in a direction toward such direction (e.g., counter-clockwise in a configuration such as depicted in FIG. 5). Consequently, in response to the aforementioned second pushing force and the bias, the lock bar spring 304 forces the protuberance 302-1 to release or unlock from the lock detent 402-4 and to enter and slide within the ejection channel 402-5 (FIG. 4), e.g., in the direction of the top arrow shown in FIG. 4.

Removable Storage Cartridge System Push-Push Mechanism

Figure 6A:
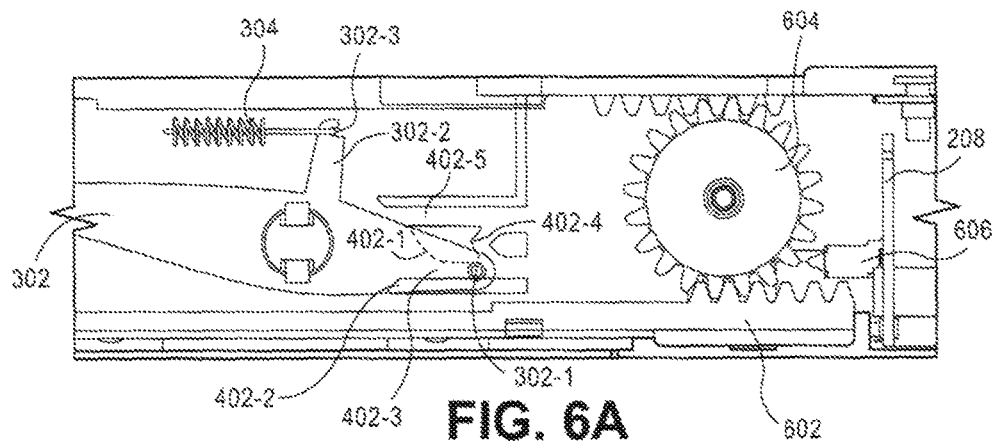
FIG. 6A is a side view illustrating a removable storage cartridge system push-push mechanism in a first position, according to an embodiment.
Figure 6B:
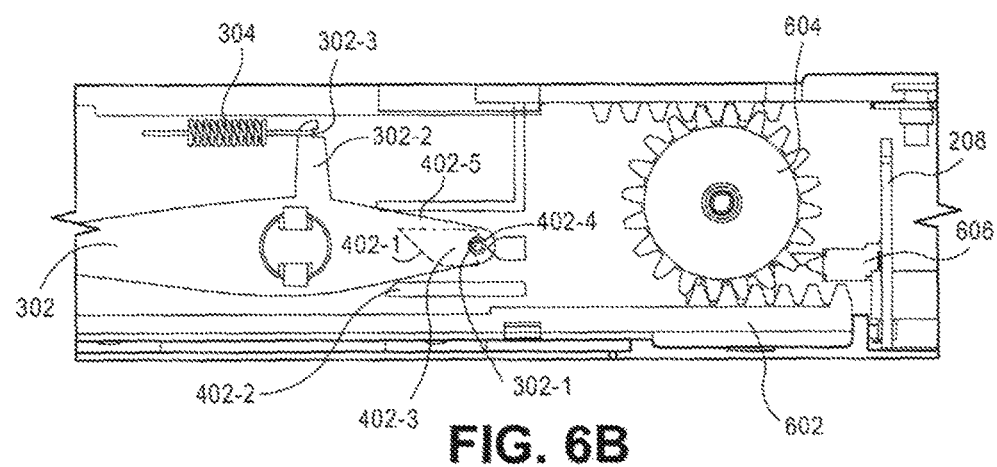
FIG. 6B is a side view illustrating a removable storage cartridge system push-push mechanism in a second position, according to an embodiment.
Figure 6C:
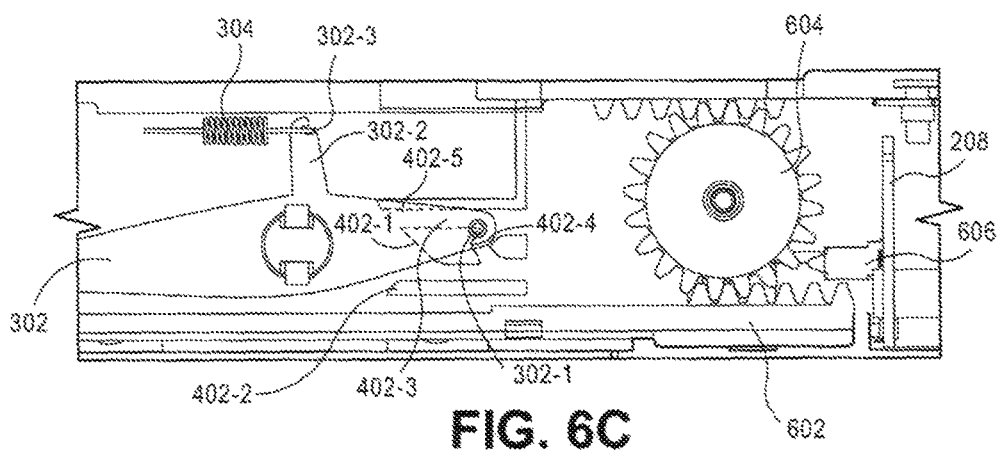
FIG. 6C is a side view illustrating a removable storage cartridge system push-push mechanism in a third position, according to an embodiment.

FIGS. 6A-6C are views illustrating a removable storage cartridge system push-push mechanism in multiple positions, according to an embodiment.

FIG. 6A is a side view illustrating a removable storage cartridge system push-push mechanism in a first position, FIG. 6B is a side view illustrating a removable storage cartridge system push-push mechanism in a second position, and FIG. 6C is a side view illustrating a removable storage cartridge system push-push mechanism in a third position, all according to an embodiment.

Shown in each of FIGS. 6A-6C are the lock bar 302, including the protuberance 302-1 and the spring attachment extension 302-2 having the spring attachment feature 302-3 to which lock bar spring 304 is attached. For example, and according to an embodiment, the foregoing lock bar 302 and lock bar spring 304 are constituent to, or coupled to the outer surface of a wall of, the carriage 204 (FIGS. 2, 3, 5). Further shown in FIG. 6A are the lock guide 402 (FIG. 4) having the inclined wall 402-1, the guide wall 402-2, the insertion channel 402-3, the lock detent 402-4, and the ejection channel 402-5. For example, and according to an embodiment, the foregoing lock guide 402 is constituent to, or coupled to the inner surface of a wall of, the mounting bracket 206 (FIGS. 2, 4). Thus, when the carriage 204 is inserted into the mounting bracket 206, the lock bar 302 and the lock bar spring 304 interact with the lock guide 402 to essentially form the linear push-push mechanism for inserting and ejecting a removable storage cartridge (e.g., cartridge 300 of FIG. 3) into and from, respectively, a removable storage cartridge system such as system 100 (FIG. 1).

FIG. 6A depicts the push-push mechanism in an interim position in response to a direct or indirect first pushing force applied to the carriage 204 (FIGS. 2, 3, 5), in the direction into, for example, a bay 104a-n (FIG. 1) of the enclosure 102 (FIG. 1) of a removable storage cartridge system such as system 100 (FIG. 1). That is, the first pushing force would be applied in a direction from left to right of the FIG. 6A drawing. Note that an indirect application of the first pushing force may include applying the first pushing force more directly to the removable storage device 202 (FIGS. 2, 3) or the cartridge 300 (FIG. 3). In this interim position, the protuberance 302-1 has already interacted with (or is in the process of interacting with) the inclined wall 402-1, is sliding along the insertion channel 402-3, and is about to engage with the lock detent 402-4. Furthermore, this initial action between the lock bar 302 and the lock guide 402 has rotated the lock bar a bit clockwise and extended the spring 304.

FIG. 6B depicts the push-push mechanism in a locked position in response to the first pushing force. In this locked position, the protuberance 302-1 has overcome the reactive force of the inclined wall 402-1 and a spring force associated with lock bar spring 304, and is engaged with the lock detent 402-4. At this point, a data interface connector associated with the removable storage device 202 (FIGS. 2, 3) has engaged with a corresponding data interface connector constituent to the PCB 208 (FIG. 2) such that information/data storage and retrieval operations between the removable storage device 202 and a communicatively-connected host device (e.g., a computer) may be performed. For non-limiting examples, each of the foregoing data interface connectors may be compatible with SATA (Serial ATA, or Serial AT [Advanced Technology] Attachment) and SAS (Serial Attached SCSI, or Serial Attached Small Computer System Interface) communication interfaces.

FIG. 6C depicts the push-push mechanism in an interim position in response to a direct or indirect second pushing force applied to the carriage 204 (FIGS. 2, 3, 5), in the direction further into, for example, a bay 104a-n (FIG. 1) of the enclosure 102 (FIG. 1) of a removable storage cartridge system such as system 100 (FIG. 1). That is, the second pushing force would be applied in the same direction as the first pushing force, thus the characterization as a "push-push mechanism". That is, the second pushing force would be applied in a direction from left to right of the FIG. 6C drawing. Note that an indirect application of the second pushing force may include applying the second pushing force more directly to the removable storage device 202 (FIGS. 2, 3) or the cartridge 300 (FIG. 3).

In this interim position, the protuberance 302-1 has now been released from the lock detent 402-4, and is about to begin sliding along the ejection channel 402-5 to complete ejection from the system 100. As described, with the lock bar spring 304 positioned at a distance and in a direction away from the protuberance 302-1, a rotational bias (a biasing force) is applied to the lock bar 302 in a direction toward such direction (e.g., counter-clockwise in a configuration such as depicted in FIGS. 6A-6C). Consequently, in response to the aforementioned second pushing force and the bias, the lock bar spring 304 forces the protuberance 302-1 to release or unlock from the lock detent 402-4 and to enter and slide within the ejection channel 402-5. Furthermore, this final action between the lock bar 302 and the lock guide 402 has rotated the lock bar a bit counter-clockwise and allowed contraction of the spring 304, with a consequent force acting in a direction from right to left of the FIG. 6C drawing. Such contraction of the spring facilitates the ejection of the cartridge 300 from the system. At this point, the data interface connector associated with the removable storage device 202 (FIGS. 2, 3) has disengaged from the corresponding data interface connector constituent to the PCB 208 (FIG. 2).

Removable Storage Cartridge System Assist Mechanism

In order to insert the removable storage device (e.g., as a removable storage device cartridge 300, or "cartridge 300", of FIG. 3) in a removable storage cartridge system (e.g., system 100 of FIG. 1), a user must overcome the electrical connector insertion force. That is, a certain amount of force, i.e., an "insertion force" (e.g., due at least in part to friction between the data interface connector 606a and the data interface connector 606b of FIG. 7) is necessary to properly mate the two connectors so that the connectors are communicatively coupled. In addition, an eject spring (e.g., eject spring 702 of FIG. 7) is utilized to overcome this electrical connector insertion force when the removable storage device is ejected from the removable storage cartridge system. Thus, the user must overcome both the insertion force and the eject spring force during the insertion process. According to an embodiment, in order to assist in overcoming these forces, a gear reduction mechanism may be used to lessen such forces.

Most gear reduction mechanisms comprise a drive gear and a driven gear. If the drive gear has a smaller diameter or number of teeth than the driven gear, then a gear reduction occurs. If the driven gear has a smaller diameter or number of teeth than the drive gear, then a gear multiplication occurs. The amount of reduction or multiplication of this gear system is based on the ratio of the diameters or number of teeth between the drive and the driven gears.

Gear Reduction/Multiplication Mechanism

Reference is made to FIGS. 6A-6C, which depict components of an assist mechanism: a rack gear 602 and a pinion gear 604, according to an embodiment. The rack gear 602 and the pinion gear 604 are configured to interact to form a gear reduction/multiplication mechanism, the operation of which is described in more detail elsewhere herein. According to an embodiment, the rack gear 602 is constituent to the carriage 204 (FIGS. 2, 3, 5) and the pinion gear 604 is constituent to the mounting bracket 206 (FIGS. 2, 4). Note also that FIGS. 6A-6C depict the PCB 208, having an electrical interconnection 606 extending therefrom in the direction of the removable storage device (e.g., removable storage device 202 of FIGS. 2 and 3). The electrical interconnection 606 refers to the pair of mating electrical connectors, where each electrical connector is constituent to one of the respective removable storage device 202 and the PCB 208.

The gear mechanism parts (comprising the rack gear 602 and the pinion gear 604) are configured and positioned on or in their respective components (e.g., the carriage 204 and mounting bracket 206, respectively) such that the gear pair engages when an insertion force is applied to the removable storage device carriage 204, such as by a user, in order to insert a cartridge 300 (FIG. 3) into a mounting bracket 206 in an enclosure 102 (FIG. 1) of a removable storage device system such as system 100 (FIG. 1).

Figure 7:
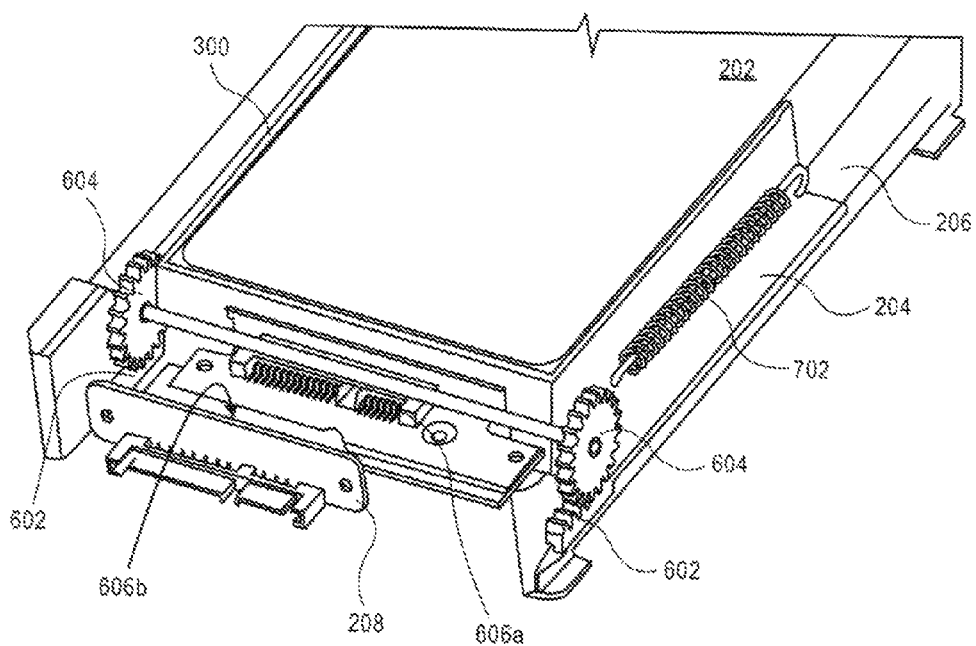
FIG. 7 is a top back perspective view illustrating a removable storage cartridge inserted in a mounting bracket, according to an embodiment.

FIG. 7 is a top back perspective view illustrating a removable storage cartridge inserted in a mounting bracket, according to an embodiment. FIG. 7 depicts a gear mechanism comprising the rack gear 602 and the pinion gear 604. As the gear mechanism may operate in multiple modes, such as a gear reduction mechanism and a gear multiplication mechanism (depending on which gear functions as the drive gear and which gear functions as the driven gear), such a gear mechanism may also be referred to herein as a "gear reduction/multiplication mechanism", a "gear reduction mechanism", and/or a "gear multiplication mechanism", all of which refer to the same rack (602) and pinion (604) gear mechanism. As previously noted and according to an embodiment, the rack gear 602 is constituent to the carriage 204, in which a removable storage device 202 is housed, and the pinion gear is constituent to the mounting bracket 206, which may be coupled with an enclosure such as enclosure 102 (FIG. 1) and positioned within an enclosure bay such as a bay 104a-n (FIG. 1). In this context, a rack and pinion gear reduction mechanism is likely to use less space than a standard two circular gear reduction system.

With reference back to the electrical interconnection 606 (FIGS. 6A-6C), FIG. 7 further depicts a data interface connector 606a constituent to the removable storage device 202 and a data interface connector 606b constituent to the PCB 208, which together comprise the electrical interconnection 606. As discussed, the user must overcome the electrical connector insertion force when inserting cartridge 300 into the system.

In addition, an eject spring 702 is utilized to overcome the electrical connector insertion force when the removable storage device is ejected from the removable storage cartridge system. The eject spring 702 is loaded (extended) when a cartridge 300 is inserted into the system, so that the eject spring 702 can provide its stored energy (i.e., an ejection force) to help with decoupling or disengaging the respective data interface connectors 606a and 606b of electrical interconnection 606, and to help with ejecting the cartridge 300 from engagement with the mounting bracket 206.

According to an embodiment, one end of the eject spring 702 (e.g., the front end) is fixed to part of the enclosure 102 (FIG. 1), and the other end (e.g., the back end) is connected to part of the mounting bracket 206. Hence, while a cartridge 300 is being inserted into the mounting bracket 206, the carriage 204 of the cartridge 300 translates toward the back of the enclosure 102 and engages with the mounting bracket 206, thereby translating the mounting bracket a certain distance toward the back of the enclosure. This distance that the mounting bracket translates corresponds to the distance the eject spring 702 is extended, which corresponds with the amount of energy/load imparted to the spring. If there was no gear reduction mechanism used (e.g., a 1:1 gear ratio), then the user would need to apply the full force $F_1$ to the carriage 204 to translate the mounting bracket 206 a distance $X_1$ to extend the eject spring 702 a distance $X_1$. However, use of a gear reduction mechanism can reduce the amount of force the user would need to apply to the carriage 204 by an amount related to the gear ratio of the gear reduction mechanism.

In the context of assisting with the eject spring 702 force and the electrical interconnection 606 force associated with the insertion process, the rack gear 602 and the pinion gear 604 (collectively, the gear reduction mechanism) interoperate to perform the gear reduction process, where the gear reduction is based on the travel of the rack gear 602 in relation to the rotation of the pinion gear 604. During insertion of the cartridge 300, the rack gear 602 (i.e., the drive gear) drives the pinion gear 604 (i.e., the driven gear), which stretches, extends, pre-loads the eject spring 702 according to the particular gear reduction. Hence, the amount of force required by a user to stretch the eject spring 702 a desired distance is less than what it would otherwise be without use of the gear reduction mechanism.

During a cartridge 300 eject cycle, the eject spring 702, by way of the stored energy (i.e., the restoring, or reaction, force) imparted to the eject spring 702 by its extension during cartridge insertion, helps the removable storage device 202 of cartridge 300 overcome the friction force of the electrical interconnection 606 and eject more easily from the system. During the eject cycle, the pinion gear 604 becomes the drive gear, and the rack gear 602 becomes the driven gear with a gear multiplication ratio of, for example, 1:3. Such a gear multiplication operates in reverse from how described in reference to the insertion cycle gear reduction, thereby assisting in the ejection of the cartridge 300 from the removable storage cartridge system based on the rack and pinion gear multiplication ratio.

Hence, by incorporating a rack and pinion gear reduction mechanism into a removable storage cartridge system, as described herein as embodiments, the insertion force of the removable storage device is reduced, which makes inserting and removing the removable storage device by the user easier and more comfortable.

Method of Configuring a Removable Storage Cartridge System

FIG. 8 is a flow diagram illustrating a method of configuring a removable storage cartridge system, according to an embodiment.

At block 802, according to an embodiment, a removable storage device cartridge, comprising a removable storage device housed in a carriage, is inserted into an enclosure bay mounting bracket. For example, cartridge 300 (FIG. 3) is inserted into mounting bracket 206 (FIG. 2) of a bay 104a-n (FIG. 1) of an enclosure 102 (FIG. 1).

The act of inserting the cartridge into the mounting bracket includes engaging a rack gear with a pinion gear to form a gear reduction mechanism that operates to assist in extending an eject spring. For example, inserting the cartridge 300 into the mounting bracket 206 includes engaging the rack gear 602 (FIGS. 6A-6C, 7) with a pinion gear 604 (FIGS. 6A-6C, 7) to assist in extending the eject spring 702 (FIG. 7), as described elsewhere herein.

According to an embodiment, the act of inserting the cartridge into the mounting bracket further includes engaging a removable storage device data interface connector with a system circuit board data interface connector. For example, inserting the cartridge 300 into the mounting bracket 206 includes engaging a removable storage device data interface connector 606a (FIG. 7) with a system circuit board data interface connector 606b (FIG. 7), forming electrical interconnection 606 (FIGS. 6A-6C), as described elsewhere herein.

At block 804, according to an embodiment, the removable storage device cartridge is ejected from within the enclosure bay mounting bracket. For example, cartridge 300 (FIG. 3) is ejected from the mounting bracket 206 (FIG. 2) of a bay 104a-n (FIG. 1) of an enclosure 102 (FIG. 1).

The act of ejecting the cartridge from the mounting bracket includes operating the rack gear with the pinion gear to form a gear multiplication mechanism that operates to assist in disengaging the removable storage device data interface connector from the system circuit board data interface connector. For example, ejecting the cartridge 300 (FIG. 3) from the mounting bracket 206 includes disengaging the removable storage device data interface connector 606a (FIG. 7) from the system circuit board data interface connector 606b (FIG. 7), as described elsewhere herein.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A removable storage cartridge system comprising:
an enclosure comprising a bay configured to house a removable storage device;
a removable storage device carriage configured to removably couple with a removable storage device;
a rack gear;
a mounting bracket movably coupled with said enclosure within said bay; and
a pinion gear;
wherein said rack gear is configured to interact with said pinion gear to form a gear reduction mechanism that, in direct response to a first pushing force applied directly or indirectly to said carriage, assists in extending an eject spring.

2. The removable storage cartridge system of claim 1, wherein said rack gear is configured to interact with said pinion gear to further assist in engaging a removable storage device data interface connector with a system circuit board data interface connector.

3. The removable storage cartridge system of claim 2, wherein said rack gear is configured to interact with said pinion gear to form a gear multiplication mechanism that, in direct response to a second pushing force applied directly or indirectly to said carriage, assists in disengaging said removable storage device data interface connector from said system circuit board data interface connector.

4. The removable storage cartridge system of claim 3, wherein said rack gear functions as a driven gear and said pinion gear functions as a drive gear in said gear multiplication mechanism.

5. The removable storage cartridge system of claim 1, wherein said carriage comprises said rack gear; and
wherein said mounting bracket comprises said pinion gear.

6. The removable storage cartridge system of claim 1, wherein said rack gear functions as a drive gear and said pinion gear functions as a driven gear in said gear reduction mechanism.

7. The removable storage cartridge system of claim 1, wherein said eject spring is fixed at one end to said enclosure and connected at another end to said mounting bracket and extends in response to translation of said mounting bracket within said enclosure.

8. The removable storage cartridge system of claim 1, wherein said enclosure comprises a plurality of bays each configured to house a respective removable storage device, wherein said removable storage cartridge system further comprises:
- a plurality of removable storage device carriages each configured to removably couple with a respective removable storage device; and
- a plurality of mounting brackets each movably coupled with said enclosure within a respective bay of said plurality of bays.

9. The removable storage cartridge system of claim 1, further comprising:
- a removable storage device removably coupled with said carriage.

10. A method of configuring a removable storage cartridge system, the method comprising:
- inserting a removable storage device cartridge, comprising a removable storage device housed in a carriage, into an enclosure bay mounting bracket;
- wherein said inserting includes engaging a rack gear with a pinion gear to form a gear reduction mechanism that operates to assist in extending an eject spring.

11. The method of claim 10, wherein said inserting further includes engaging a removable storage device data interface connector with a system circuit board data interface connector.

12. The method of claim 11, further comprising:
- ejecting said removable storage device cartridge from within said enclosure bay mounting bracket;
- wherein said ejecting includes operating said rack gear with said pinion gear to form a gear multiplication mechanism that operates to assist in disengaging said removable storage device data interface connector from said system circuit board data interface connector.

13. The method of claim 12, wherein said rack gear functions as a driven gear and said pinion gear functions as a drive gear in said gear multiplication mechanism.

14. The method of claim 10, wherein said rack gear functions as a drive gear and said pinion gear functions as a driven gear in said gear reduction mechanism.

15. The method of claim 10,
- wherein said carriage comprises said rack gear;
- wherein said mounting bracket comprises said pinion gear; and
- wherein said eject spring is fixed at one end to said enclosure and connected at another end to said mounting bracket and extends in response to translation of said mounting bracket within said enclosure.

16. A removable storage system enclosure comprising:
- a bay configured to house a removable storage device;
- a mounting bracket within said bay, wherein said mounting bracket comprises a pinion gear; and
- an eject spring fixed at one end to said enclosure and connected at another end to said mounting bracket;
- wherein said pinion gear is configured to interact with a removable storage device carriage rack gear to form a gear reduction mechanism that, in direct response to a first pushing force applied directly or indirectly to said carriage, assists in extending said eject spring.

17. The removable storage system enclosure of claim 16, wherein said gear reduction mechanism further assists in engaging a removable storage device data interface connector with a system circuit board data interface connector;
- wherein said pinion gear is configured to interact with said rack gear to form a gear multiplication mechanism that, in direct response to a second pushing force applied directly or indirectly to said carriage, assists in disengaging said removable storage device data interface connector from said system circuit board data interface connector.

18. The removable storage system enclosure of claim 16, said enclosure further comprising:
- a plurality of bays each configured to house a respective removable storage device; and
- a plurality of mounting brackets each within a respective bay of said plurality of bays.

19. A removable storage device carriage configured to removably couple with a removable storage device, the carriage comprising:
- a rack gear;
- wherein said rack gear is configured to interact with a removable storage system mounting bracket pinion gear to form a gear reduction mechanism that, in direct response to a first pushing force applied directly or indirectly to said carriage, assists in extending an eject spring.

20. The removable storage device carriage of claim 19, wherein said gear reduction mechanism further assists in engaging a removable storage device data interface connector with a system circuit board data interface connector;
- wherein said rack gear is configured to interact with said pinion gear to form a gear multiplication mechanism that, in direct response to a second pushing force applied directly or indirectly to said carriage, assists in disengaging said removable storage device data interface connector from said system circuit board data interface connector.

* * * * *